United States Patent Office 3,374,201
Patented Mar. 19, 1968

3,374,201
POLYESTERS FROM A MIXTURE OF DIFFERENT AROMATIC DICARBOXYLIC ACIDS
Maria V. Wiener, Akron, Ohio, assignor to The Goodyear Tire & Rubber Company, Akron, Ohio, a corporation of Ohio
No Drawing. Filed Mar. 13, 1964, Ser. No. 351,834
16 Claims. (Cl. 260—47)

ABSTRACT OF THE DISCLOSURE

Polyester which has good cut-through resistance is prepared from (a) terephthalic acid, isophthalic acid, 2,6- or 2,7- or 1,5-naphthalene dicarboxylic acid, 4,4'-diphenyl dicarboxylic acid, $$HOOC.C_6H_4.(CH_2)_n.C_6H_4.COOH$$

or $$HOOC.C_6H_4.O.(CH_2)_n.O.C_6H_4.COOH$$

in which $n$ is 1 to 4, (b) a diol and (3) an hydroxy-di-acid, 15 to 50 mol percent of all of the acid being hydroxy di-acids.

---

This invention relates to polyesters, before and after cross-linking, and their preparation.

The polyesters of this invention are prepared from (1) one or more aromatic dicarboxylic acids of the class consisting of terephthalic acid, isophthalic acid, 2,6- and 2,7- and 1,5-naphthalene dicarboxylic acids, 4,4'-diphenyl dicarboxylic acid and diacids having the formulae

and

in which $n$ is 1 to 4, inclusive, or a lower alkyl ester thereof (such as a mono- or di-methyl or ethyl ester), (2) one or more diols of the class consisting of acyclic diols each containing up to six carbon atoms and cyclic diols each containing up to eight carbon atoms, and (3) one or more hydroxy-diacids, which preferably have the formula

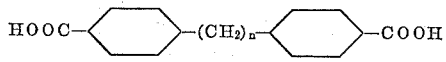

in which $n$ is 1 to 4, inclusive, or a lower alkyl ester thereof (such as a mono- or di-methyl or -ethyl ester), and R is selected from the class consisting of hydrogen, methyl, methylol and hydroxyl, and in which $(CR_2)_n$ includes at least one hydroxyl group and there is no more than one hydroxyl group on any C. These one or more hydroxyl groups form cross links with carboxyl groups on curing.

Aliphatic hydroxy-diacids such as malic acid, tartaric acid, hydroxyglutaric acids and other alpha, omega-(hydroxy-alkane) diacids containing 1 to 4 carbon atoms in the alkane group and their lower alkyl esters may be used in carrying out the invention, but the aromatic hydroxy-diacids of the foregoing formula generally give superior results particularly for electrical insulation, since they are generally more resistant to thermal, hydrolytic and oxidative degradation.

Polyols are not necessary to obtain cross-linking and are preferably omitted. A process advantage in the use of the aromatic hydroxy-diacids rather than polyols lies in the fact that they are higher boiling than glycerine and the other polyols usually employed, and there is less volatilization loss during the reaction. Also, they render the new polyesters thermally and hydrolytically more stable than are those of the prior art. The cross-linked polyester whether applied as insulation to an electrical conductor or applied to an object other than an electrical conductor possesses high thermal resistance.

The use of polyols in polyesters to obtain cross linking, particularly in polyesters to be used as electrical insulation, is illustrated by Precopio et al. 2,936,296 and Sheffer et al. 2,889,304. Electrical insulation can be produced by the process of the present invention which is better than that produced with polyols as there disclosed.

The one or more aromatic dicarboxylic acids are selected from the class which includes terephthalic acid, isophthalic acid, 2,6- and 2,7- and 1,5-naphthalene dicarboxylic acids, 4,4'-diphenyl dicarboxylic acid, 4,4'-diphenylmethane dicarboxylic acid, 4,4'-diphenoxyalkane dicarboxylic acid, and other 4,4'-diphenylalkane dicarboxylic acids which contain up to six methylenic linkages. In a preferred polyester of this invention, at least 50 mol percent, and preferably at least 60 mol percent of the acid units are terephthalic acid. Instead of the acid, a lower alkyl ester (such as a methyl or ethyl ester) may be used, the alkyl group being replaced and volatilized during the alcoholysis.

The one or more diols that may be used include those commonly employed in the production of polyesters, and include, for example, ethylene glycol and other alkane glycols containing up to 6 carbon atoms and two hydroxyl groups (preferably primary hydroxyl groups, trans- and/or cis-cyclohexanedimethanol, 4,4'-di-(beta-hydroxy ethoxy) benzene, 4,4'-di-(beta-hydroxy ethoxy) diphenyl, 4,4'-di-(beta-hydroxy ethoxy) diphenyl dimethyl methane and other diol reaction products of diphenols with ethylenechlorhydrin, etc. A substantial molar excess of diol over the sum of the molar amounts of the aromatic dicarboxylic acid and the hydroxy diacid may be used in the reaction mixture if one of the monomer diols is low boiling, and the excess distills out during the reaction. Otherwise, the amounts of monomers used preferably provide an equivalent or only a slight excess of hydroxy groups to the available carboxy groups.

The one or more hydroxy-diacids represent 15 to 50 (and preferably 25 to 40) mol percent of all of the diacid units in the polyester. Such acids include, for example, alpha-oxydiphenylmethane-dicarboxylic acid-(4,4') which has the formula

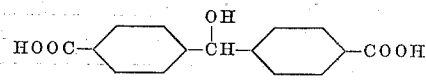

and compounds such as

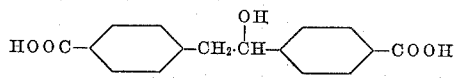

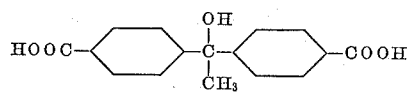

and

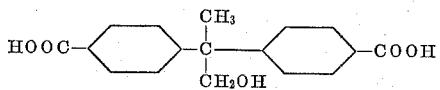

In carrying out the esterification or alcoholysis and subsequent polycondensation reactions, it is desirable to use catalysts to speed up the reaction rate. Esterification and alcoholysis catalysts include, for example, toluene sulfonic acid and compounds of lead, zinc, cadmium, beryllium, copper, magnesium, tin, iron, nickel, manganese, titanium, etc., which are soluble in the reaction mixture. The cross-linking is likewise carried out at an elevated temperature using any cross-linking catalyst of which the following are mentioned as representative: soluble compounds of zinc, manganese, cobalt, lead, cadmium, calcium, titanium and other metals, often used in the form of their octoates, naphthenates, linoleates, etc. and aliphatic and aromatic isocyanates, etc. Usually not over 5 percent of either type of catalyst will be satisfactory. Cross linking and polycondensation can be carried out with aromatic isocyanates of which much larger amounts may be required.

The different materials may be reacted in any desired order. The glycol may be first reacted with the aromatic dicarboxylic acid before reacting with the hydroxy-diacid. All three may be mixed together. The hydroxy-diacid or its lower ester may be reacted with the diol, before adding the aromatic dicarboxylic acid. The diol may be first reacted with the alkyl ester of an aromatic dicarboxylic acid and then with the hydroxy-diacid. The lower alkyl esters of the aromatic dicarboxylic acid and the hydroxy-diacid may be reacted simultaneously with the glycol. In every case, poly-condensation of the reactants into an essentially linear chain follows, and this reaction must be stopped prior to gelation. The intrinsic viscosity of the polyester at this stage of the reaction (measured conventionally in a solution of phenol and sym.-tetrachloroethane) is usually about 0.15 to 0.5. The upper limit will depend upon the amount and type of the hydroxy-diacid. The polyester may now be dissolved in a solvent suitable for dipping or spraying or brushing, such solvents including cresols, xylols, cresylic acids, their mixtures with low-boiling petroleum solvents, etc. The solids content is generally 15 to 40 percent of the solution, by weight.

The cross-linking catalyst is preferably added at this stage in the operation. If the polyester is to be used as insulation it is now applied to the conductor by dipping, brushing or spraying. The polyester, free of solvent, and containing a cross-linking agent, may be used for coating a variety of objects by use in a "fluidized bed," "electrostatic spray," "flame spray," etc. It may be molded or otherwise shaped. The polyester is then cross-linked by heating. Several coating applications may be made with partial or complete cross linking after each.

Modifications will suggest themselves to those skilled in the art. Other resins may be mixed with the polyester during or after its formation.

The following example is illustrative:

*Example*

The following were placed in a standard glass-tube polymerization vessel equipped with a stirrer:

|  | Grams |
|---|---|
| Dimethylterephthalate (0.13 mol) | 25.2 |
| Ethylene glycol (0.21 mol) | 13.0 |
| Zinc diacetate | 0.006 |

A slow stream of nitrogen was passed over the reaction mixture. Methanol was volatilized and its removal proceeded at 217° C., bath temperature, about one hour until the alcoholysis was complete. Then 19 grams (0.07 mol) of 4,4'-dicarboxybenzylhydrol were added to the reactor and at 245° C., bath temperature, the pressure was slowly reduced within the next hour to 1.5 mm. Hg while excess of ethylene glycol and water distilled out. When the product reached an intrinsic viscosity of about 0.4 (short of gelation) as measured in a solution of phenol and sym. tetrachloroethane, the reaction was terminated by establishing atmospheric pressure with nitrogen and by cooling the product or this might be done by the addition of solvent to the product.

Four grams of the above polyester polymer were dissolved in 9.3 grams of cresylic acid. A clear solution (30 percent solids content) resulted. This solution was further diluted with 2.7 grams of aromatic petroleum solvent to 25 percent solids, by weight. Zinc naphthenate was then added in an amount sufficient to yield 0.5 percent zinc, based on the weight of the polyester. A steel electrical conductor was dipped into this solution and thereafter cured at 427° C. for 1 minute. Dipping and curing were repeated five times to build up a satisfactory insulation. The cut-through temperature of the coated conductor (determined by a method similar to that described in Precopio et al. 2,936,296) was 230° C. After curing an additional 2 minutes at 427° C. the cut-through temperature (similarly determined) was 302–305° C. These cut-through temperatures are over 100° C. higher than those of conventional insulations of the prior art (identically applied and tested) in which poly-functional alcohols were used as the poly-functional monomer.

The invention is covered in the claims which follow.

What I claim is:
1. A polyester of
(1) an aromatic dicarboxylic acid selected from the class consisting of terephthalic acid, isophthalic acid, 2,6- and 2,7- and 1,5-naphthalene dicarboxylic acids, 4,4'-diphenyl dicarboxylic acid and diacids having the formulae

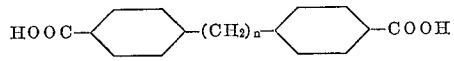

and

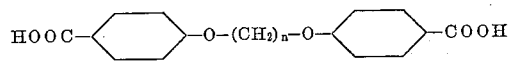

in which $n$ is 1 to 4,
(2) a diol of the class consisting of acyclic diols containing 2 to 6 carbon atoms and cyclic diols containing up to 8 carbon atoms, and
(3) hydroxy-aromatic diacids having the formula

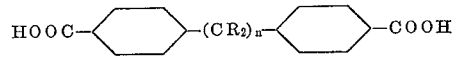

in which $n$ is 1 to 4 and R is selected from the class consisting of hydrogen, methyl, methylol and hydroxy, and in which $(CR_2)_n$ includes at least one hydroxyl group and there is no more than one hydroxyl group on each C,
15 to 50 mol percent of all of the diacid units being hydroxy-diacid units.

2. The polyester of claim 1 in which 25 to 40 mol percent of all of the diacid units are aromatic hydroxy-diacid units, the hydroxyl group of the hydroxy-carboxylic acid being cross-linkable with carboxyl groups.

3. The polyester of claim 1 in which the acid portion is 15 to 50 mol percent derived from alpha-oxydiphenyl-methane-dicarboxylic acid-(4,4') with the balance an aromatic dicarboxylic acid, the hydroxyl group of the hydroxy-carboxylic acid being cross-linkable with carboxyl groups.

4. The polyester of claim 1 in which the acid portion is at least 50 mol percent terephthalate with at least 15 percent of the balance of the acid portion being derived from an aromatic hydroxy-diacid, the hydroxyl group of the hydroxy-carboxylic acid being cross-linkable with carboxyl groups.

5. The polyester of claim 1 in which the acid portion is at least 60 percent terephthalate with at least 25 percent of the balance of the acid portion being derived from an aromatic hydroxy-diacid, the hydroxyl group of the hydroxy-carboxylic acid being cross-linkable with carboxyl groups.

6. The polyester of claim 1 in which the diol is ethylene glycol, the hydroxyl group of the hydroxy-carboxylic acid being cross-linkable with carboxyl groups.

7. An electrical conductor insulated with the polyester of claim 13.

8. An electrical conductor insulated with the polyester of claim 2.

9. An electrical conductor insulated with the polyester of claim 3.

10. An electrical conductor insulated with the polyester of claim 4.

11. An electrical conductor insulated with the polyester of claim 5.

12. An electrical conductor insulated with the polyester of claim 6.

13. The polyester of claim 1 which is cross-linked.

14. The cross-linked polyester of claim 1 in which the diol is ethylene glycol and an aromatic hydroxy-diacid is used.

15. The cross-linked polyester of claim 1 in which the diol is a glycol and a lower alkyl ester of an aromatic hydroxy-diacid is used.

16. The process of producing a polyester which comprises reacting
(1) a compound selected from the class consisting of terephthalic acid, isophthalic acid, 2,6- and 2,7- and 1,5-naphthalene dicarboxylic acids, 4,4'-diphenyl dicarboxylic acid and diacids having the formulae

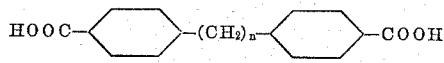

and

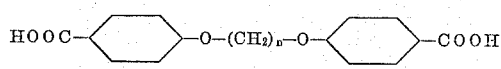

in which $n$ is 1 to 4.

(2) a diol of the class consisting of acyclic diols containing 2 to 6 carbon atoms, and
(3) hydroxy-aromatic diacids having the formula

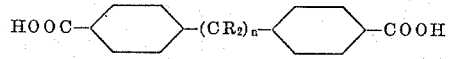

in which $n$ is 1 to 4 and R is selected from the class consisting of hydrogen, methyl, methylol and hydroxyl, and in which $(CR_2)_n$ includes at least one hydroxyl group and there is no more than one hydroxyl group on each C, and 15 to 50 mol percent of all of the diacid units being hydroxy-diacid units, and in which process a lower alkyl ester may be used instead of its acid, and cross-linking.

References Cited

UNITED STATES PATENTS 2,426,913  9/1947  Adelson et al. _____ 260—75

FOREIGN PATENTS 599,097  3/1945  Great Britain.
588,833  6/1947  Great Britain.

WILLIAM H. SHORT, *Primary Examiner.*

R. LYON, *Assistant Examiner.*